United States Patent [19]

Haas

[11] Patent Number: 4,536,236

[45] Date of Patent: Aug. 20, 1985

[54] SELECTING HYDROXY-TERMINATED POLYBUTADIENE FOR HIGH STRAIN PROPELLANTS

[75] Inventor: Lawrence W. Haas, Sandy, Utah

[73] Assignee: Hercules Incorporated, Wilmington, Del.

[21] Appl. No.: 482,667

[22] Filed: Apr. 6, 1983

[51] Int. Cl.³ .............................................. C06B 45/10
[52] U.S. Cl. ................................. 149/19.92; 149/19.9; 523/180
[58] Field of Search ............................ 149/19.92, 19.9; 523/180

[56] References Cited

U.S. PATENT DOCUMENTS

| | | | |
|---|---|---|---|
| 3,891,816 | 6/1975 | Scott et al. | 149/19.91 |
| 4,133,706 | 1/1979 | Shoults | 149/19.2 |
| 4,279,985 | 7/1981 | Nonogaki et al. | 430/272 |
| 4,428,785 | 1/1984 | Suzuki et al. | 149/19.9 |

*Primary Examiner*—Edward A. Miller
*Attorney, Agent, or Firm*—Edmund C. Ross, Jr.

[57] ABSTRACT

This invention relates to an improved procedure for selecting hydroxy-terminated polybutadiene in making crosslinked products therefrom. The procedure is based on the discovery that like appearing hydroxy-terminated polybutadienes differing by very small amounts of epoxy functionality behave very differently in crosslinked matrices.

4 Claims, No Drawings

SELECTING HYDROXY-TERMINATED POLYBUTADIENE FOR HIGH STRAIN PROPELLANTS

BACKGROUND OF THE INVENTION

1. Field of Use

This invention relates to analytical methods for quality control in the selection of hydroxy-terminated polybutadiene polymers from commercial lots thereof and to products resultant from practice of these methods. This invention, more particularly, relates of predicting how the aforementioned commercial lots will function in crosslinked net works by an examination of the microstructures of the hydroxy-terminated polybutadiene materials prior to incorporation in such networks.

2. Prior Art

Hydroxy-terminated polybutadiene polymers find wide industrial application. When crosslinked, they can form part of a matrix useful as a rubbery binder in propellants, coatings, composites and the like. As a consequence, diverse grades of hydroxy-terminated polybutadiene are available on a commercial scale.

The nature of hydroxy-terminated polybutadiene is often critical in obtaining desired properties of the end product in which the crosslinked polybutadiene serves as a matrix or binder material. The need for special hydroxy-terminated polybutadienes ordinarily is met by testing various grades thereof and selecting the grade or grades particularly suited to give the matrix its desired properties.

In certain instances, however, it has been discovered that this selection process is inadequate for consistently predicting which hydroxy-terminated polybutadienes will function appropriately. In particular, it has been discovered that use of hydroxy-terminated polybutadiene sold under the same tradename unexpectedly gives crosslinking matrices of variable strain properties, even when the hydroxy-terminated polybutadiene identically performs in standard analytical tests. As a result, considerable expense is incurred when products derived from this hydroxy-terminated polybutadiene do not meet specifications.

It would be desirable, therefore, if there were a simple test which could distinguish between commercial lots of hydroxy-terminated polybutadienes sold under the same name such that their performance could be predicted with unqualified assurance.

In this regard, and in accordance with this invention, it has been discovered that (a) hydroxy-terminated polybutadiene produced commercially by seemingly the same process (i.e., catalysis with hydrogen peroxide) may sometimes contain nearly indetectable amounts of epoxy functionality and (b) use of hydroxy-terminated polybutadienes having above a certain amount of such epoxy functionality can impart significantly lower strain capacity to the crosslinked matrices resulting from their use as compared to use of those hydroxy-terminated polybutadienes having below such amount of the epoxy functionality.

OBJECTS OF THE INVENTION

It is an object of this invention to provide a fascile analytical method for predicting the performance of hydroxy-terminated polybutadiene as a binder material in crosslinked products when the hydroxy-terminated polybutadiene is made by polymerizing butadiene with an catalyst such as hydrogen peroxide.

It is an object of this invention to provide such a method which enhances the reliability of strain performance in propellants manufactured with commercial lots of hydroxy-terminated polybutadiene.

These and other objects have been achieved by this invention as will be appreciated by the following disclosure thereof.

BRIEF SUMMARY OF THE INVENTION

This invention relates to selection of hydroxy-terminated polybutadiene from commercial lots thereof wherein the hydroxy-terminated polybutadiene is made by polymerization of butadiene with a catalyst such as hydrogen peroxide. The selection is in the manufacture of rubbery matrices with specified physical characteristics, this manufacture including crosslinking the hydroxy-terminated polybutadiene with such external crosslinking agents as di and polyfunctional isocyanates. This invention, more particularly, improves the capacity to make this selection by a control procedure adapted to distinguish between otherwise like appearing but diversely performing commercial lots of the hydroxy-terminated polybutadiene. The improved procedure in its currently preferred practice comprises selecting a sample of the hydroxy-terminated polybutadiene from a first of the commercial lots of sufficient size to permit nuclear magnetic resonance (NMR) analysis of the microstructure thereof; establishing through the (NMR) analysis of this hydroxy-terminated polybutadiene from such sample the relative nature as to epoxy content thereof; and marking or otherwise identifying this first and subsequent commercial lots on the basis such analyses with respect to the results expected from crosslinking thereof during the manufacturing operation. The marking or other means for identifying the hydroxy-terminated polybutadienes distinguishes between those hydroxy-terminated polybutadienes which contain epoxy functionality and those which are substantially free of epoxy functionality.

The improved control procedure of this invention is particularly useful in manufacture of propellants with specified strain characteristics.

DETAILED DESCRIPTION OF THE INVENTION

This invention relates particularly to hydroxy-terminated polybutadiene made by a process which includes polymerization of butadiene with an catalyst such as hydrogen peroxide. These hydroxy-terminated polybutadienes have hydroxy groups which substitute carbons and are in cis, trans, or vinyl relation to a carbon-carbon double bond in the polymer. The hydroxy-terminated polybutadienes typically (and preferably for manufacture of propellants) have hydroxy functionalities greater than 2 and molecular weights (number average) between about 2500 and 3200.

Nuclear magnetic resonance spectroscopy (NMR) is the preferred analytical tool through which this invention differentiates hydroxy-terminated polybutadienes from among various commercial lots thereof. The lots are, except for the properties of matrices resulting from their use, otherwise are virtually indistinguishable from each other using such other standard analytical techniques as infrared spectroscopy, gel permeation chromatography and hydroxy and acid number analyses.

NMR is a widely known and used technique. This invention can be practiced without resort to complicated theories or procedures any more than is involved in standard application of the NMR techniques. The NMR analysis, however, needs to be sufficiently sensitive to distinguish between the three types of carbon atoms bearing hydroxy substituents (see Table A hereinafter for specific identification of these hydroxy-substituted carbon atoms) in the hydroxy-terminated polybutadiene sample undergoing examination.

The preferred NMR analysis is $^{13}$C-NMR analysis in which certain non-equivalent carbon atoms in the hydroxy-terminated polybutadiene yield distinct, measurable resonance lines. However, proton-NMR analysis is also suitable, providing it can resolve signals from the non-equivalent hydrogen atoms on the carbon atoms alpha to the hydroxy groups of the hydroxy-terminated polybutadiene.

The three resonances which are to be resolved by the NMR analysis of this invention are resultant of: (a) hydroxy substituted carbon atoms which are in the vinyl position relative to a carbon carbon double bond group (hereinafter called "vinyl-hydroxy"); (b) hydroxy substituted carbon atoms which are in the trans position relative to a carbon carbon double bond group (hereinafter called "trans-hydroxy"); and (c) hydroxy substituted carbon atoms which are in the cis position relative to a carbon carbon double bond group (hereinafter called "cis-hydroxy"). These hydroxy substituted carbon atoms are more particularly identified by reference to the following structures in Table A:

TABLE A (A) $RCH(CH_2OH)CH=CH_2$, ie "Vinyl-hydroxy";

(B) 
$$\begin{array}{c} R \\ \diagdown \\ \phantom{x}C=C \\ \diagup \\ H \end{array} \begin{array}{c} H \\ \diagup \\ \diagdown \\ CH_2OH \end{array}, \text{ ie "Trans-hydroxy"; and}$$

(C)
$$\begin{array}{c} R \\ \diagdown \\ \phantom{x}C=C \\ \diagup \\ H \end{array} \begin{array}{c} CH_2OH \\ \diagup \\ \diagdown \\ H \end{array}, \text{ ie "Cis-hydroxy";}$$

wherein each of the R's is the remainder of the same or a different hydroxy-terminated polybutadiene polymer molecule and the terminal carbons in (A), (B) and (C) are respectively the vinyl-hydroxy, trans-hydroxy and cis-hydroxy carbon atoms discussed above.

The hydroxy-terminated polybutadienes to which this invention applies, each contain all of these (i.e. vinyl, trans and cis) hydroxys in varying amounts, as determined by the NMR analysis. For example, a hydroxy-terminated polybutadiene sample may be analyzed to yield the distribution of hydroxy groups as set forth in Table B:

TABLE B

| vinyl-hydroxy | 31% |
|---|---|
| trans-hydroxy | 54% |
| cis-hydroxy | 15% |
| Total | 100% |

These percentages are obtained by integrating the signal or signature for each of these groups, adding together the integrated amounts, and dividing the total into the integrated amount obtained for each group.

In practice of this invention, either high or low resolution NMR analysis can be used. If low resolution NMR analysis is employed, then "nominal" cis-hydroxy is the marker for determining the strain capabilities of the hydroxy-terminated polybutadiene undergoing study. When the "nominal" cis-hydroxy is about 16% or below, the strain capability of the polymer materials is relatively high. Conversely, when this "nominal" cis-hydroxy is above 16%, say 19%, the strain capability is relatively low.

"Nominal" cis-hydroxy as used herein refers to the fact that certain carbon atoms in hydroxy-terminated polybutadiene have a signature so closely related to the cis-hydroxy signal and so minor in amplitude as to be effectively indistinguishable therefrom in low resolution $C^{13}$ NMR analysis. In confirmation of the presence of these carbon atom species yielding a NMR signal closely spaced to that of the cis-hydroxy, hydroxy-terminated polybutadienes have been reacted with isocyanate so that the resulting reaction product does not contain any free hydroxy. The presence of an NMR signal which remains at about the location of the cis-hydroxy signal (ie 58.3 ppm) confirms the presence of these carbon atom species, believed to be cis and trans epoxy carbons at 56.5 ppm and 58.1 ppm, respectively.

The method of this invention, however, does not require reaction of the hydroxy of the hydroxy-terminated polybutadiene in the samples undergoing examination. Rather, the nominal cis-hydroxy can be used as a marker in predicting aforesaid strain performance. If, however, $C^{13}$ NMR analysis or proton NMR analysis of sufficiently high resolution is employed in practice of this invention, then the presence of over about 3% of combined cis and trans epoxy (based total hydroxy and epoxy present), can mark hydroxy-terminated polybutadiene with low strain capabilities.

In accordance with this invention, it is to be understood that "high" and "low" strain performance are used herein in reference to crosslinked matrices made with a singly specified isocyanate compound.

The following examples illustrate this invention and provide further amplification of its principles. The invention, however, is not limited to the details of these examples but, rather, as set forth in the claims appended hereto.

EXAMPLES

The reagents, apparatus and procedures set forth below were used in providing the data for illustration of this invention in the following examples.

A. Reagents
1. deuterochloroform—(99.9% Deuterium—dried over 3—Angstrom molecular sieves
2. n-Hexylisocyanate—Eastman Kodak Co.
3. Dibutyl tin diacetate (DBTDA)—ICN Pharmaceuticals
4. Tetramethylsilane (TMS)—NMR reference standard
5. Hydroxy-terminated polybutadiene (HTPB)—R45HT or R45M sold by Arco Corporation.

B. Apparatus
1. Fourier Transform nuclear magnetic resonance instrument (FTNMR) capable of observing $^{13}$C nuclei and proton decoupling. The instrument used was a Varian CFT-20.
2. Instrumental parameters
   A. Pulse width=60°
   B. Pulse delay=1 sec
   C. Number of scans=30K (instrument dependent)

D. Width of plot=400 Hz
E. End of plot=1100 Hz
F. Vertical scale=set so that carbon to the cis-hydroxy (58.3 ppm) intensity is ½ of chart width.
3. NMR tubes—8 mm OD ultraprecision or larger depending on instrument capabilities.
4. Syringe—1 cc disposable.

C. Procedure

1. As Received Sample

In to a clean NMR tube was added 1.0 mls of the HTPB using a disposable 1 cc syringe. To this was added 0.8 mls of deuterochloroform and 5 drops of TMS as reference. The tube was capped and shook until all of the polymer was in solution. The tube was placed in the NMR instrument and the spectrum obtained using the instrumental conditions outlined. The areas of the cis OH (S=58.3 ppm), trans OH (S=63.4 ppm) and vinyl OH (S=64.9 ppm) carbon resonance lines were integrated. The percentage of each was calculated using area normalization.

2. Derivatization of the hydroxyls with isocyanate

To a clean dry NMR tube was added 1.0 ml of HTPB using a disposable 1 cc syringe. To this was added 0.8 ml deuterochloroform and 5 drops of TMS reference. The tube was capped and shook well until the polymer was in solution. When well mixed, 300 μl n-hexylisocyanate and 5 μl DBTDA catalyst were then added. The result was mixed well and placed in a 120° F. oven for 3 hours to complete reaction. A spectrum was obtained using the instrumental conditions outlined. The spectrum included the resonance lines: (60.0 ppm), (65.2 ppm) and (66.8 ppm) which were attributed to the isocyanate reaction products of the cis-hydroxy, trans-hydroxy and vinyl-hydroxy groups, respectively. The percentage of each was calculated using area normalization. The resonance lines remaining at 56.5 ppm and 58.1 ppm were determined to be attributable to the cis and trans-epoxide.

Set forth in Table I, below, are the results from NMR analyses of fifteen (15) different lots of hydroxy-terminated polybutadiene that were designated either R45M or R45HT as received from ARCO. Table II shows the results of such analyses after derivatization of the hydroxy-terminated polybutadiene by isocyanate to eliminate the epoxy contribution to the cis-hydroxy.

TABLE I

Distribution of Hydroxyl Type in HTPB by $^{13}$C-NMR

| HTPB Type | Designation | (A) CIS | OH % Trans | Vinyl |
|---|---|---|---|---|
| R45M | A | 15 | 54 | 31 |
| R45M | B | 15 | 52 | 32 |
| R45M | C | 15 | 53 | 32 |
| R45M | D | 17 | 53 | 30 |
| R45M | E | 19 | 51 | 30 |
| R45M | F | 18 | 53 | 29 |
| R45M | G | 19 | 52 | 29 |
| R45M | H | 19 | 52 | 29 |
| R45M | I(1) | 18 | 50 | 32 |
|  | (2) | 19 | 51 | 30 |
| R45HT | J | 23 | 47 | 30 |
| R45HT | K | 21 | 50 | 29 |
| R45HT | L | 22 | 48 | 30 |
| R45HT | M | 21 | 48 | 31 |
| R45HT | N | 22 | 48 | 30 |
| R45HT | O | 23 | 47 | 29 |

(A) Includes epoxide contribution to the area of cis-hydroxy.

TABLE II

Distribution of Hydroxyl Type After Reaction with Isocyanate to Eliminate Epoxide Contribution to Cis-Hydroxy Area

| Sample | Cis-hydroxy[A] | Trans-hydroxy[A] | Vinyl-hydroxy[A] |
|---|---|---|---|
| R45M |  |  |  |
| P | 16 | 56 | 28 |
| Q | 15 | 53 | 32 |
| R | 15 | 55 | 30 |
| S | 15 | 53 | 31 |
| T | 16 | 55 | 28 |
| R45HT |  |  |  |
| U | 16 | 55 | 29 |
| V | 16 | 56 | 29 |

[A] Hydroxyl groups reacted with n-hexylisocyanate with DBTDA as catalyst.

As can be seen from Tables I and II, after epoxy functionality is eliminated, the HTPB have about the same distribution of cis-, trans and vinyl-hydroxy. This apppears to indicate that the hydroxy-terminated polybutadienes are very similar except for the presence of epoxy functionality. Gel permeation chromatography results, however, have indicated that the HTPB having epoxy functionality may have slightly higher functionality in the higher molecular weight fraction.

Table III shows the strain characteristics of matrices made with hydroxy-terminated polybutadiene having various nominal cis-hydroxy contents. As can be seen, the higher the nominal cis-hydroxy content, the lower the strain capability of the resulting matrix.

TABLE III

| Sample | Cis Hydroxy[a] | Curative[b] | Approximate Strain (%)[c] |
|---|---|---|---|
| A | 15 | DDI | 570 |
| B | 15 | DDI | 480 |
| C | 15 | HMDI | 330 |
| D | 15 | HMDI | 280 |
| E | 18 | HMDI | 190 |
| F | 19 | DDI | 270 |
| G | 20 | DDI | 180 |
| H | 23 | DDI | 180 |

[a] By C$^{13}$ NMR analysis, includes contribution of epoxy.
[b] DDI stands for dimeryldiisocyanate; HMDI stands for hexaxethylenediisocyanate.
[c] ASTM procedure.

What is claimed is:

1. In selection of hydroxy-terminated polybutadiene from commercial lots thereof for manufacture of propellants for rocket motors with specified physical characterisitics wherein said manufacture includes crosslinking said hydroxy-terminated polybutadiene with an isocyanate crosslinking agent reactive therewith and said hydroxy-terminated polybutadiene is made with a catalyst such as hydrogen peroxide, an improved quality control procedure adapted to distinguish between hydroxy-terminated polybutadiene in commercial lots thereof that are otherwise like appearing, but sufficiently chemically different to yield propellants of diverse strain characteristics, said improved quality control procedure comprising:

selecting samples of said hydroxy-terminated polybutadiene from each of said commercial lots prior to manufacture of propellants therewith, said samples being of sufficient size to perform an NMR analysis on each;

performing said NMR analysis on each of said samples to determine whether there is more or less than about 3% of combined cis and trans epoxy groups based on the total of cis-, trans and vinyl-hydroxy groups and cis- and trans-epoxy groups in each of said samples;

using only hydroxy-terminated polybutadiene having less than about 3% of combined cis and trans epoxy for manufacture of high strain propellants.

2. The selection hydroxy-terminated polybutadiene in accordance with claim 1, wherein said NMR analysis is high resolution NMR analysis.

3. The selection of hydroxy-terminated polybutadiene in accordance with claim 1, wherein said NMR analysis is low resolution NMR analysis.

4. The selection of hydroxy-terminated polybutadiene in accordance with claim 3, wherein the total of cis hydroxy in said hydroxy-terminated polybutadiene used for high strain propellant is about 16% or below based on the total of the cis-, trans- and vinyl- hydroxy present.

* * * * *

UNITED STATES PATENT AND TRADEMARK OFFICE
CERTIFICATE OF CORRECTION

PATENT NO. : 4,536,236

DATED : August 20, 1985

INVENTOR(S) : Lawrence W. Haas

It is certified that error appears in the above-identified patent and that said Letters Patent are hereby corrected as shown below:

Column 6, Table III, Footnote b;

"hexaxethylenediisocyanate"

should read: --hexamethylenediisocyanate--

Signed and Sealed this

Fifteenth Day of October 1985

[SEAL]

Attest:

Attesting Officer

DONALD J. QUIGG

Commissioner of Patents and Trademarks—Designate